Aug. 5, 1958 S. T. WILLIAMS 2,845,980
TUBELESS TIRE VALVE
Filed Dec. 2, 1954
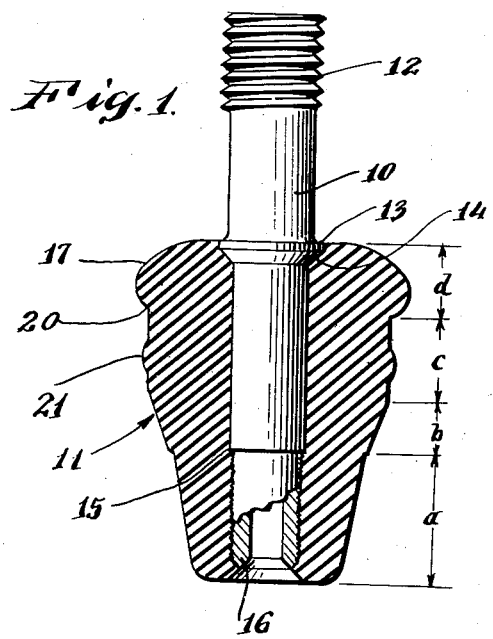
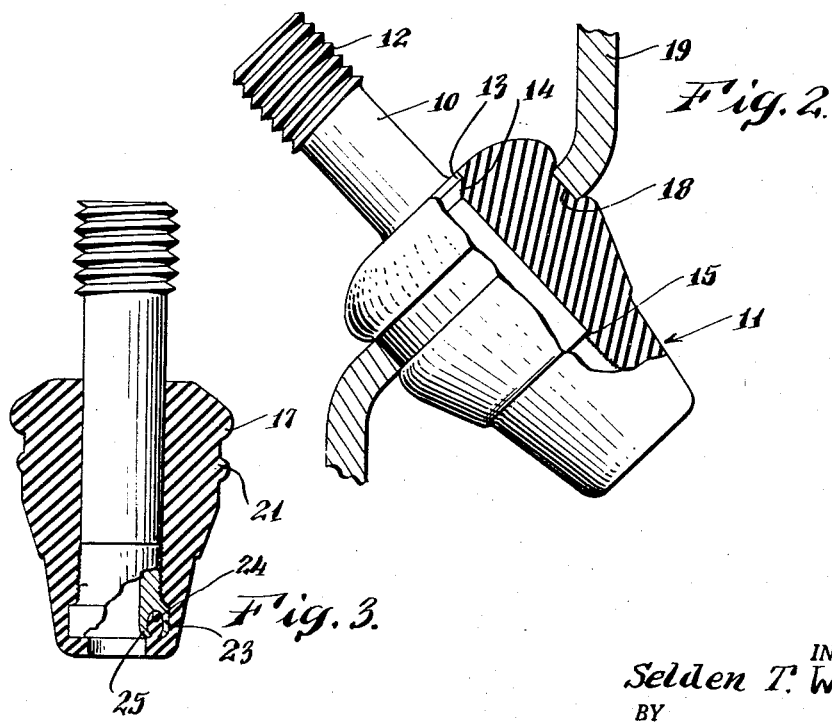
INVENTOR.
Selden T. Williams
BY
Churchill, Rich, Weymouth & Engel
ATTORNEYS.

United States Patent Office 2,845,980
Patented Aug. 5, 1958

2,845,980

TUBELESS TIRE VALVE

Selden T. Williams, Bellerose, N. Y., assignor to Scovill Manufacturing Company, Waterbury, Conn., a corporation of Connecticut Application December 2, 1954, Serial No. 472,737

7 Claims. (Cl. 152—427)

The present invention relates to valve stems for tubeless tires and aims to provide certain improvements in such valve stems.

Tubeless tires on automobiles are meeting with popular favor and at present are being furnished as standard equipment on many makes of passenger cars. There is also a strong probability that tubeless tires will find favor for use on trucks and tractors.

The present invention has among its various objects (1) to provide a valve stem for use on passenger car, truck and tractor wheel rims which can be quickly applied to such rims, either prior to or after the tire has been mounted thereon; (2) to provide such valve stem which can be quickly mounted on the rim without the aid of supplemental clamping means; (3) to provide such valve stem which can be manually or mechanically pushed or forced into the conventional valve stem rim hole, make a fluid-tight seal with the rim and be held against accidental displacement or blow-out in use; and (4) to provide such valve stem which is simple and economical to manufacture and efficient in use.

The foregoing and other objects of the invention not specifically enumerated, are accomplished by providing on a rigid tubular valve stem insert an elastomeric housing coaxially encompassing and bonded to the insert, in part, said housing being externally tapered axially from its entering end outwardly and having an axial portion of slightly larger diameter than the rim hole in which the valve stem is to be mounted and wherein the non-bonded portion of the housing is located in the region of the axial portion of larger diameter to enable said portion to be stretched to reduce its diameter under inserting pressure and, after insertion and release of the stretching force, the stretched portion of the housing will snap back to fill the rim hole to anchor the valve stem to the rim. The invention will be more fully understood from the detailed description which follows, when considered in connection with the accompanying drawings, wherein:

Figure 1 shows in axial section a tubeless tire valve stem embodying the invention, part of the insert being shown in elevation.

Fig. 2 shows the valve stem of Fig. 1, partly broken away, mounted on a wheel rim.

Fig. 3 shows in axial section a tubeless tire valve stem embodying the invention as particularly adapted for use on tractor tires.

Referring first to Figs. 1 and 2 of the drawings, the valve stem comprises a tubular insert 10 to which is adhesively bonded, in part, an elastomeric housing 11.

The tubular insert 10 is preferably formed of metal and, as is conventional, has a threaded nipple portion 12 and an internal chamber adapted to accommodate a standard, replaceable valve insides or core (not shown). As herein shown, the tubular insert has an intermediate flange or enlargement 13 providing a shoulder 14 and a second shoulder 15 in proximity to the inner or entering end 16 of the valve stem, i. e., the end of the valve stem which extends into the air chamber of a tubeless tire.

The elastomeric housing 11 is preferably formed of rubber and is externally tapered from the entering end of the valve stem to its outer end whereat it is formed with an enlarged bead 17. The external wall of the housing may be considered as having adjacent axial portions indicated as *a*, *b*, *c* and *d* of different diameters, the portion *a* being of smaller diameter than a hole 18 in a wheel rim 19 upon which the valve is to be mounted; the portion *b* being tapered and at its largest diameter is slightly larger than the diameter of the hole 18; the portion *c* being of substantially uniform diameter slightly larger than the diameter of the hole 18; and the portion *d*, which embraces the enlarged bead 17, being of considerably larger diameter than the hole in the rim and forming with the portion *d* a shoulder 20. The portion *c* is preferably formed with a flattened peripheral bead 21, the function for which will presently appear. The housing 11 is bonded to the insert 10, only in part, and the axial extent of said bonding preferably corresponds with the axial dimension of the housing portion *a*, but need not be so limited, the remainder of the axial part of the housing being unbonded to the insert. In the molding of the housing around the insert, any suitable means may be employed for preventing adhesion between the housing and the tubular insert at the part where no adhesion or bonding is desired.

From a consideration of the valve stem construction hereinbefore described, it will be understood that the valve stem may be readily mounted onto a wheel rim for a tubeless tire either prior to mounting the tire on the rim or after such tire has been mounted on the rim. To mount the valve stem on the rim, the valve stem is merely pushed into the rim hole, preferably with the aid of a suitable lubricant such as soapy water. In the course of mounting the valve stem, the axial portion *a* and part of the axial *b* will readily pass through the rim hole. As the larger end of the axial portion *b* engages the wall of the rim hole, the application of pressure stretches the housing, rearwardly of said enlarged diameter, thus making it smaller, and after insertion and engagement of the shoulder 20 against the rim face, the release of the inserting pressure causes the stretched portion of the housing to endeavor to return to its initial untensioned condition, which results in the axial portion of the housing between the peripheral bead 21 and enlarged bead 17 to be confined within the rim hole under stress, whereupon the peripheral bead portion 21 thereby becomes enlarged and engages over the face of the rim opposite to that against which the bead 17 abuts, as best shown in Fig. 2. The valve stem when so mounted will hold tightly onto the rim and if one tries to force the valve stem out, the bonded portion of the housing will act as a plug, thus further expanding and locking the housing in the rim hole.

The valve stem shown in Fig. 3 is primarily intended for use with tractor tires designed to be filled or partially filled with water or calcium chloride solution. To prevent such calcium chloride solution from destroying the bond between the rubber housing and the metal insert, the inner end of the insert is slightly enlarged, as shown at 23, and formed with an annular groove 24 within which the rubber of the housing is bonded. After molding, the annular walls of the groove 24 are then pinched together, as shown at 25, to greatly retard the corrosive action of the calcium chloride in weakening the bond between the rubber and the metal and giving rise to a source of leakage. The type of valve stem as embodied in Fig. 3 has novel advantages when applied to a tractor tire, as the valve stem need not be mounted in the wheel rim until after the tire is mounted on the rim and filled with liquid, in the course of which filling operation the large rim hole is used to quickly charge the liquid into the tire. It is only after the tire has been filled with liquid that the valve is inserted and the topping up pressure of air applied. It will be understood that by positioning the valve hole uppermost of the rim, all the liquid needed may be inserted without loss and that in the course of charging the liquid into the tire, the trapped air may be bled out by tipping the liquid filler nozzle. The insertion of the valve stem into the rim hole after the tire has been filled with liquid follows the procedure as hereinbefore described with respect to the valve stem shown in Figs. 1 and 2.

Although I have shown and described certain preferred embodiments of my invention, it is to be understood that changes in details of construction may be resorted to within the range of mechanical and engineering skill without departing from the spirit of the invention as hereinafter claimed.

What I claim is:

1. A unitary tubular valve stem for mounting on a wheel rim for a tubeless tire, said valve stem comprising a rigid tubular insert and an elastomeric housing coaxially encompassing and bonded to the tubular insert adjacent its inner end and having an axial part of the encompassing portion unbonded to the insert, the housing having adjacent axial portions of different external diameters, a first of said portions being bonded to the insert and of a diameter slightly smaller than the diameter of the hole in a wheel rim on which the valve stem is to be mounted, and a second portion of slightly larger diameter adjacent the first portion and of slightly larger diameter than the hole in the rim, the housing in the region of said second portion encompassing the insert and being unbonded thereto and capable of being tensioned or stretched in relation to the bonded portion to reduce the external diameter of said second portion, whereby said second portion will be tensioned as it engages the wall defining the hole in the rim as the bonded end is pushed through said rim hole, and when said second portion is within the rim hole and the tensioning force is withdrawn, said second portion will, due to the contractile force of the tensioned housing lock the valve stem onto the rim.

2. A valve stem according to claim 1, wherein the housing extends to the inner end of the tubular insert and is generally tapered radially outward from said inner end to said second portion.

3. A unitary tubular valve stem for mounting on a wheel rim for a tubeless tire, said valve stem comprising a rigid tubular insert and an elastomeric housing coaxially encompassing and bonded to the tubular insert adjacent its inner end and having an axial part of the encompassing portion unbonded to the insert, the housing having adjacent axial portions of different external diameters, a first of said portions tapering outwardly toward the outer end of the valve stem and at its larger end being of a diameter slightly larger than the diameter of the hole in a wheel rim on which the valve stem is to be mounted, and a second portion of substantially uniform diameter adjacent the larger end of the first portion and equal in diameter to said larger end, the housing in the region of said second portion encompassing the insert and being unbonded to and capable of being axially tensioned or stretched in relation to the bonded portion to reduce the external diameter of said second portion, whereby said second portion will be tensioned as it engages the wall defining the hole in the rim as the bonded end is pushed through said rim hole, and when said second portion is within the rim hole and the tensioning force is withdrawn, said second portion will, due to the contractile force of the tensioned housing lock the valve stem onto the rim.

4. A valve stem according to claim 3, wherein the housing adjacent the end of said second portion remote from the first portion has a third axial portion of larger diameter than the second portion and provides a shoulder with said second portion adapted to engage a face of the rim to limit the extent of insertion of the valve stem through the rim hole.

5. A valve stem according to claim 4, wherein the housing throughout the axial dimensions of the second and third portions is unbonded to the tubular insert.

6. In combination, a tubeless tire wheel rim having a hole therein for an inflating tire valve and a tire valve mounted in said rim hole from the side of the rim exterior to that which supports the tubeless tire when mounted on said rim, said tire valve comprising a rigid tubular insert and an elastomeric housing coaxially encompassing said insert and bonded thereto, in part, said housing having adjacent axial poritions of different external diameters, a first of said portions being bonded to the insert at the entered end thereof and having an external diameter smaller than the rim hole, a second axial portion adjacent said first portion normally of slightly larger diameter than the rim hole, and a third axial portion of larger diameter than the second portion and providing a shoulder with said second portion, which shoulder abuts against one face of the rim and limits the insertion of the valve stem through the rim, the housing in the region of said second and third portions being unbonded to the insert and axially stretchable in relation to the bonded portion in the course of mounting the valve stem in the rim, said second portion where it extends through the rim hole being under tension, and where it extends inwardly through the rim hole it forms a shoulder in engagement with the tire supporting face of the rim due to the displacement of the elastomeric material of the housing by the stress imparted to the rim hole engaging portion of said housing.

7. The combination according to claim 6, wherein the second axial portion of the housing has a peripheral integral bead in spaced relation to the shoulder formed between the second and third axial portions, and said bead is enlarged under the stress imparted to the rim hole engaging portion of said housing, to augment the shoulder engagement of the housing with the tire supporting face of the rim.

References Cited in the file of this patent

UNITED STATES PATENTS

| | | |
|---|---|---|
| 1,071,595 | Terrell | Aug. 26, 1913 |
| 1,193,992 | Cigol | Aug. 8, 1916 |
| 2,049,252 | Eberhard | July 28, 1936 |
| 2,634,785 | Tubbs | Apr. 14, 1953 |
| 2,769,476 | Herzegh | Nov. 6, 1956 |